United States Patent
Kira et al.

(10) Patent No.: US 10,216,031 B2
(45) Date of Patent: Feb. 26, 2019

(54) LIQUID CRYSTAL DISPLAY AND METHOD FOR ADJUSTING LIQUID CRYSTAL DISPLAY

(71) Applicant: Mitsubishi Electric Corporation, Tokyo (JP)

(72) Inventors: Shuichi Kira, Tokyo (JP); Manabu Iwakawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/586,427

(22) Filed: May 4, 2017

(65) Prior Publication Data
US 2017/0351140 A1  Dec. 7, 2017

(30) Foreign Application Priority Data
Jun. 6, 2016 (JP) ................. 2016-112645

(51) Int. Cl.
G02F 1/1333 (2006.01)
G02F 1/1335 (2006.01)
G02F 1/1339 (2006.01)

(52) U.S. Cl.
CPC .... G02F 1/133514 (2013.01); G02F 1/13394 (2013.01); G02F 1/133512 (2013.01); G02F 2001/133357 (2013.01)

(58) Field of Classification Search
CPC ......... G02F 1/133514; G02F 1/133512; G02F 1/13394
See application file for complete search history.

(56) References Cited

U.S. PATENT DOCUMENTS

| 5,042,920 A * | 8/1991 | Yoshino | G02B 5/201 349/106 |
|---|---|---|---|
| 7,548,288 B2 | 6/2009 | Kim et al. | |
| 8,179,350 B2 | 5/2012 | Park et al. | |
| 8,259,264 B2 * | 9/2012 | Kim | G02F 1/1323 349/106 |
| 8,665,192 B2 | 3/2014 | Nagashima et al. | |
| 2005/0140856 A1 * | 6/2005 | Choi | G02F 1/133512 349/110 |

FOREIGN PATENT DOCUMENTS

| JP | 2006-079104 A | 3/2006 |
|---|---|---|
| JP | 2006-178461 A | 7/2006 |
| JP | 2011-075844 A | 4/2011 |

* cited by examiner

*Primary Examiner* — Lucy P Chien
(74) *Attorney, Agent, or Firm* — Studebaker & Brackett PC

(57) ABSTRACT

A technique disclosed in the specification relates to preventing a reduction in aperture ratio and visible lines between bright and dark portions. A liquid crystal display in a technique disclosed in the specification includes a plurality of pixel arranged in a liquid crystal display panel in a plan view, a light blocking layer disposed between the plurality of pixels in a plan view, and a colorant layer provided to overlap each of the plurality of pixels. The light blocking layer includes a first region and a second region narrower than the first region in a plan view. The colorant layer has a transmittance lower in a region adjacent to the second region than a transmittance in a region adjacent to the first region.

17 Claims, 8 Drawing Sheets

LIQUID CRYSTAL DISPLAY AND METHOD FOR ADJUSTING LIQUID CRYSTAL DISPLAY

BACKGROUND OF THE INVENTION

Field of the Invention

A technique disclosed in the specification relates to a liquid crystal display and a method for adjusting the liquid crystal display.

Description of the Background Art

One way to reduce drive circuit chips to minimize manufacture cost is using a dual-scanning-line liquid crystal display.

As disclosed in Japanese Patent Application Laid-Open No. 2006-178461 or Japanese Patent Application Laid-Open No. 2006-079104, for example, the dual-scanning-line liquid crystal display includes scanning signal lines extending in an x-axis direction, a plurality of video signal lines extending in a y-axis direction, a plurality of thin film transistors (TFTs) connected to the respective video signal lines, and pixel electrodes connected to the respective TFTs.

In the dual-scanning-line liquid crystal display, two of the TFTs and the pixel electrodes connected to the two respective TFTs are arranged between the video signal lines in the x-axis direction. Here, the two TFTs and the pixel electrodes connected to the respective TFTs, between the video signal lines in the x-axis direction, are referred to as a pair of pixels.

With reference to the pixel electrodes next to each other in the x-axis direction, the TFTs connected to the respective pixel electrodes are connected in common to the video signal line.

The TFT has a gate electrode connected to the scanning signal line. In this respect, two of the scanning signal lines are interposed between adjacent pairs of pixels in the y-axis direction. Accordingly, the two TFTs in one pair of pixels do not share the scanning signal lines with the two TFTs in the other pair of pixels, which is next to the one pair of pixels in the y-axis direction.

In other words, with reference to the adjacent pairs of pixels in the y-axis direction, gate electrodes of the TFTs are not connected in common to the scanning signal line.

By virtue of such a configuration, the dual-scanning-line liquid crystal display reduces by half the number of video signal lines per pixel.

This reduces components such as video signal ICs for driving the video signal lines, thereby achieving an inexpensive liquid crystal display.

In the dual-scanning-line liquid crystal display, the pixel electrodes next to each other in the x-axis direction are configured such that the TFTs connected to the respective pixel electrodes are connected in common to the video signal line. Meanwhile, the video signal lines are each not disposed between the pixel electrodes that constitute one pair of pixels.

Each video signal line, which typically includes a light blocking layer, is not disposed between the pixel electrodes constituting the one pair of pixels. This eliminates the need for reflecting an electric-field leak that is possibly generated near the video signal line or a light leak from a liquid crystal layer due to misalignment.

As such, the light blocking layer tends to have a width smaller in a region between the pixels in the absence of the video signal line between the adjacent pixel electrodes in the x-axis direction, than a width in a region between the pixels in the presence of the video signal line between the adjacent pixel electrodes in the x-axis direction.

With reference to the center of gravity of an opening in each pixel, i.e., the center of gravity of a region without the light blocking layer in each pixel, a comparison is made between an arrangement pattern of the light blocking layers having different widths and an arrangement pattern of the light blocking layers with the same width.

The comparison finds that the center of gravity of the opening in each pixel shifted toward the narrower light blocking layer in the arrangement pattern of the light blocking layers having different widths, when compared with that in the arrangement pattern of the light blocking layers with the same width.

As described above, the arrangement pattern of the light blocking layers having different widths in the x-axis direction, is configured such that the center of gravity of the opening in each pixel is shifted toward the narrower light blocking layer in the x-axis direction. Such a configuration causes a non-uniform distribution of brightness to thus result in visible lines between bright and dark portions, extending in the y-axis direction.

Accordingly, to avoid these visible lines between the bright and dark portions, provided is a technique of intentionally increasing the width of the light blocking layer in the x-axis direction in the absence of the video signal line between the pixel electrodes next to each other in the x-axis direction, so that the light blocking layer in the presence of the video signal line between the adjacent pixel electrodes in the x-axis direction has the same width as the light blocking layer in the absence of the video signal line between the adjacent pixel electrodes in the x-axis direction.

In this case, the light blocking layer is configured such that the regions with the same width are uniformly arranged. Consequently, the centers of gravity of the openings in the individual pixels are positioned at equal intervals. This reduces the visible lines between the bright and dark portions.

Unfortunately, this method excessively increases the width of the narrower region of the light blocking layer in the x-axis direction, to thus result in a reduction in aperture ratio. This leads to a reduction in brightness.

Meanwhile, one way to prevent the reduction in brightness is increasing the brightness of a backlight. To do this, however, the number of light emitting diodes (LEDs) or the power consumption of the LEDs needs to be increased. Doing so results in increased manufacture cost or increased power consumption.

Alternatively, Japanese Patent Application Laid-Open No. 2006-079104 discloses a method that includes placing the TFT for pixel drive and the light blocking layer that blocks light in a region with the TFT, in part of the region between the pixels in the absence of the video signal line between the pixel electrodes next to each other.

The method also includes making the brightness uniform in the region between the pixels of the pixel electrodes next to each other. Doing so reduces the visible lines between the bright and dark portions while preventing the reduction in aperture ratio.

Unfortunately, this method results in a configuration in which the TFT that needs to be connected to the video signal line, and the light blocking layer, which blocks the light in the region with the TFT, are disposed in a position remote from the video signal line, i.e., in a position close to the region between the pixels in the absence of the video signal line between the pixel electrodes next to each other.

Such a configuration enlarges a light-blocking portion created by a wire for establishing a connection between the TFT and the video signal line. This still results in the reduction in aperture ratio.

SUMMARY

The technique disclosed in the specification relates to preventing a reduction in aperture ratio and reducing visible lines between bright and dark portions.

A first aspect of the technique disclosed in the specification includes a plurality of pixels arranged in a liquid crystal display panel, a light blocking layer disposed between the plurality of pixels in a plan view; and a colorant layer provided to overlap each of the plurality of pixels in a plan view. The light blocking layer includes a first region and a second region narrower than the first region in a plan view. The colorant layer has a transmittance lower in a region adjacent to the second region than a transmittance in a region adjacent to the first region.

A second aspect of the technique disclosed in the specification includes a plurality of pixels arranged in a liquid crystal display panel, a light blocking layer disposed between the plurality of pixels in a plan view; and a gap control layer provided to overlap at least each of the plurality of pixels in a plan view. The light blocking layer includes a first region and a second region narrower than the first region in a plan view. The gap control layer is thicker in a region adjacent to the second region than in a region adjacent to the first region.

A third aspect of the technique disclosed in the specification is a method for adjusting a liquid crystal display. The liquid crystal display includes a plurality of pixels arranged in a liquid crystal display panel, a light blocking layer disposed between the plurality of pixels, and a colorant layer provided to overlap each of the plurality of pixels in a plan view. The light blocking layer includes a first region and a second region narrower than the first region in a plan view. The colorant layer has a transmittance lower in a region adjacent to the second region than a transmittance in a region adjacent to the first region. The method includes regulating color purity and white brightness in the plurality of pixels in their entirety in accordance with an average of a transmittance of the colorant layer.

The first and second aspects of the technique disclosed in the specification prevent the reduction in aperture ratio and reduce the visible lines between the bright and dark portions.

In the third aspect of the technique disclosed in the specification, setting the transmittance of the colorant layer in accordance with the average of the transmittance within the colorant layer would reduce a bad influence on the properties of the color purity and the properties of the white brightness if a single pixel is locally provided with two regions: one including a region with a higher transmittance than a transmittance achieving desired color purity or desired white brightness; and the other including a region with a lower transmittance than such a transmittance.

These and other objects, features, aspects and advantages of the present invention will become more apparent from the following detailed description of the present invention when taken in conjunction with the accompanying drawings.

DESCRIPTION OF THE PREFERRED EMBODIMENTS

The preferred embodiments will be described with reference to the accompanying drawings.

The drawings are schematic, and thus some configurations are not shown or are briefly illustrated for convenience. Further, mutual relationships between the sizes and positions of images that are illustrated in different drawings are not necessarily accurate, and thus can be changed as appropriate.

Throughout the following descriptions, like elements are denoted by the same symbols, and are also provided with the same names and the same functions. Hence, detailed descriptions of the like elements can be omitted for avoiding a repetition.

Throughout the following descriptions, the use of terms, such as "top", "under", "side", "bottom", "front", and "back", that indicate specific positions and specific directions is merely for convenience in easy understanding of the preferred embodiments. These terms thus have nothing to do with actual directions when the embodiments are actually implemented.

First Preferred Embodiment

The following describes a liquid crystal display and a method for adjusting the liquid crystal display, according to a first preferred embodiment. For convenience of description, a dual-scanning-line liquid crystal display will be first described.

Figure 10:
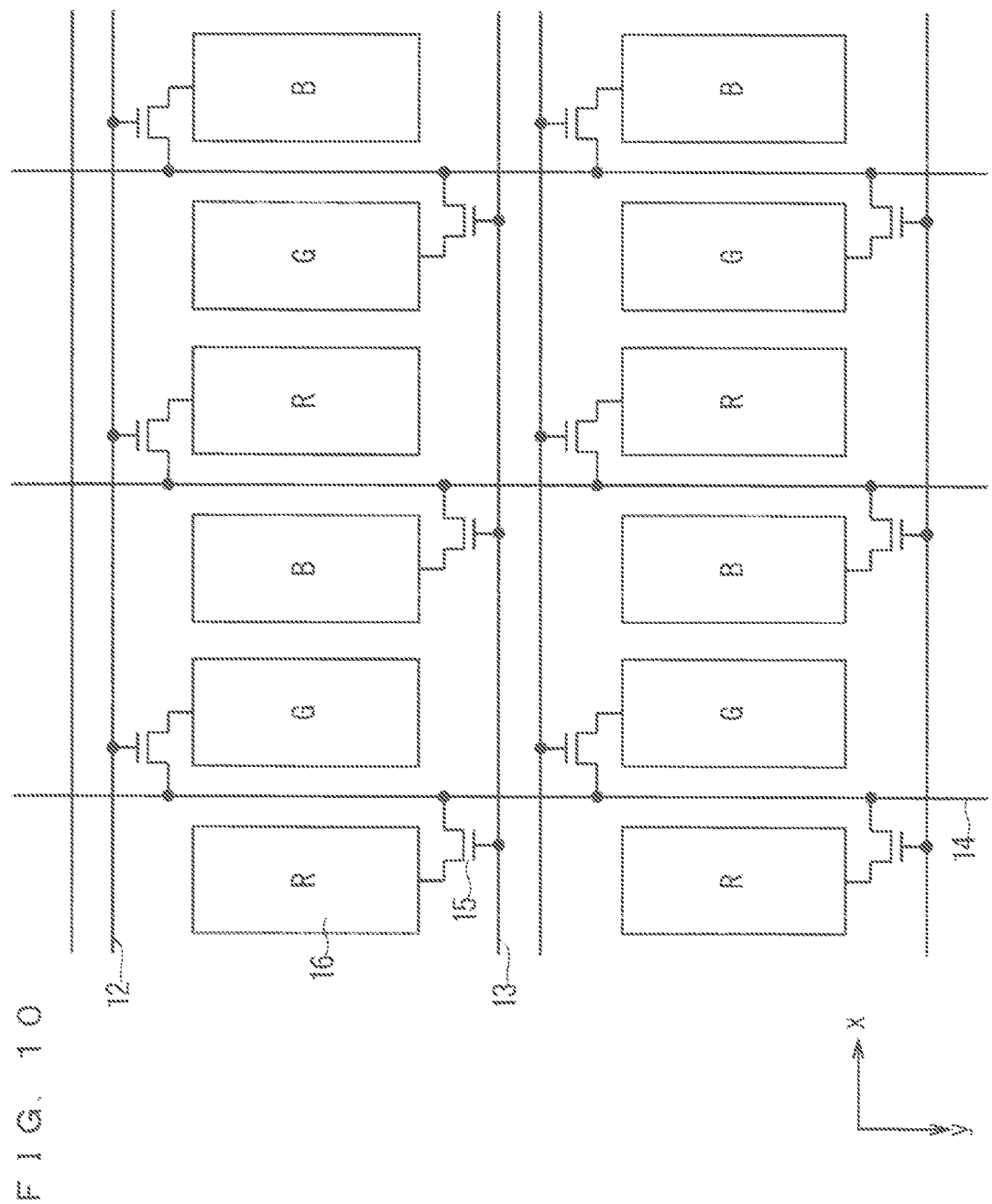
FIG. 10 is a schematic plan view of a configuration of a dual-scanning-line liquid crystal display.

FIG. 10 is a schematic plan view of a configuration of the dual-scanning-line liquid crystal display.

As illustrated in FIG. 10, the dual-scanning-line liquid crystal display includes scanning signal lines 12 extending in an x-axis direction, scanning signal lines 13 extending in the x-axis direction, a plurality of video signal lines 14 extending in a y-axis direction, a plurality of TFTs 15 connected to the respective video signal lines 14, and pixel electrodes 16 connected to the respective TFTs 15.

The scanning signal lines 12 and the scanning signal lines 13 are alternately arranged in the y-axis direction. Moreover, each TFT 15 and each pixel electrode 16 connected to the corresponding TFT 15 are arranged between the scanning signal line 12 and scanning signal line 13 in the y-axis direction.

Two of the TFTs 15 and two of the pixel electrodes 16 connected to the two respective TFTs 15 are arranged between the video signal lines 14 in the x-axis direction. Here, the two TFTs 15 between the video signal lines 14 in the x-axis direction and the two pixel electrodes 16 connected to the two respective TFTs 15, are referred to as a pair of pixels.

Reference is made to the pixel electrodes 16 next to each other in the x-axis direction with the video signal line 14 interposed therebetween. The TFTs 15 connected to the respective pixel electrodes 16 are connected in common to the video signal line 14.

Each TFT 15 has a gate electrode connected to the scanning signal line 12 or the scanning signal line 13. Here, with reference to the two TFTs 15 within the pair of pixels, the gate electrode of one TFT 15 is connected to the scanning signal line 12, and the gate electrode of the other TFT 15 is connected to the scanning signal line 13.

Both the scanning signal lines 12 and the scanning signal lines 13 are arranged between neighboring pairs of pixels in the y-axis direction. Consequently, the two TFTs 15 in one pair of pixels do not share the scanning signal lines 12 and 13 with the two TFTs 15 in the other pair of pixels, which is next to the one pair of pixels in the y-axis direction.

In other words, with reference to the adjacent pairs of pixels in the y-axis direction, the gate electrodes of the TFTs 15 are not connected in common to the scanning signal line 12 or the scanning signal line 13.

By virtue of such a configuration, the dual-scanning-line liquid crystal display reduces by half the number of video signal lines 14 per pixel.

This reduces components such as video signal ICs for driving the video signal lines 14 to thus achieve an inexpensive liquid crystal display.

In the dual-scanning-line liquid crystal display, the pixel electrodes 16 next to each other in the x-axis direction are configured such that the TFTs 15 connected to the respective pixel electrodes 16 are connected in common to the video signal line 14. Meanwhile, the video signal lines 14 are each not disposed between the pixel electrodes 16 that constitute one pair of pixels.

Each video signal line 14, which is typically formed using a light blocking layer, is not disposed between the pixel electrodes 16 constituting the one pair of pixels. This eliminates the need for reflecting an electric-field leak that is possibly generated near the video signal line 14 or a light leak from a liquid crystal layer due to misalignment.

As such, the light blocking layer tends to have a width smaller in a region between the pixels in the absence of the video signal line 14 between the pixel electrodes 16 next to each other in the x-axis direction, than a width in a region between the pixels in the presence of the video signal line 14 between the pixel electrodes 16 next to each other in the x-axis direction.

Figure 11:
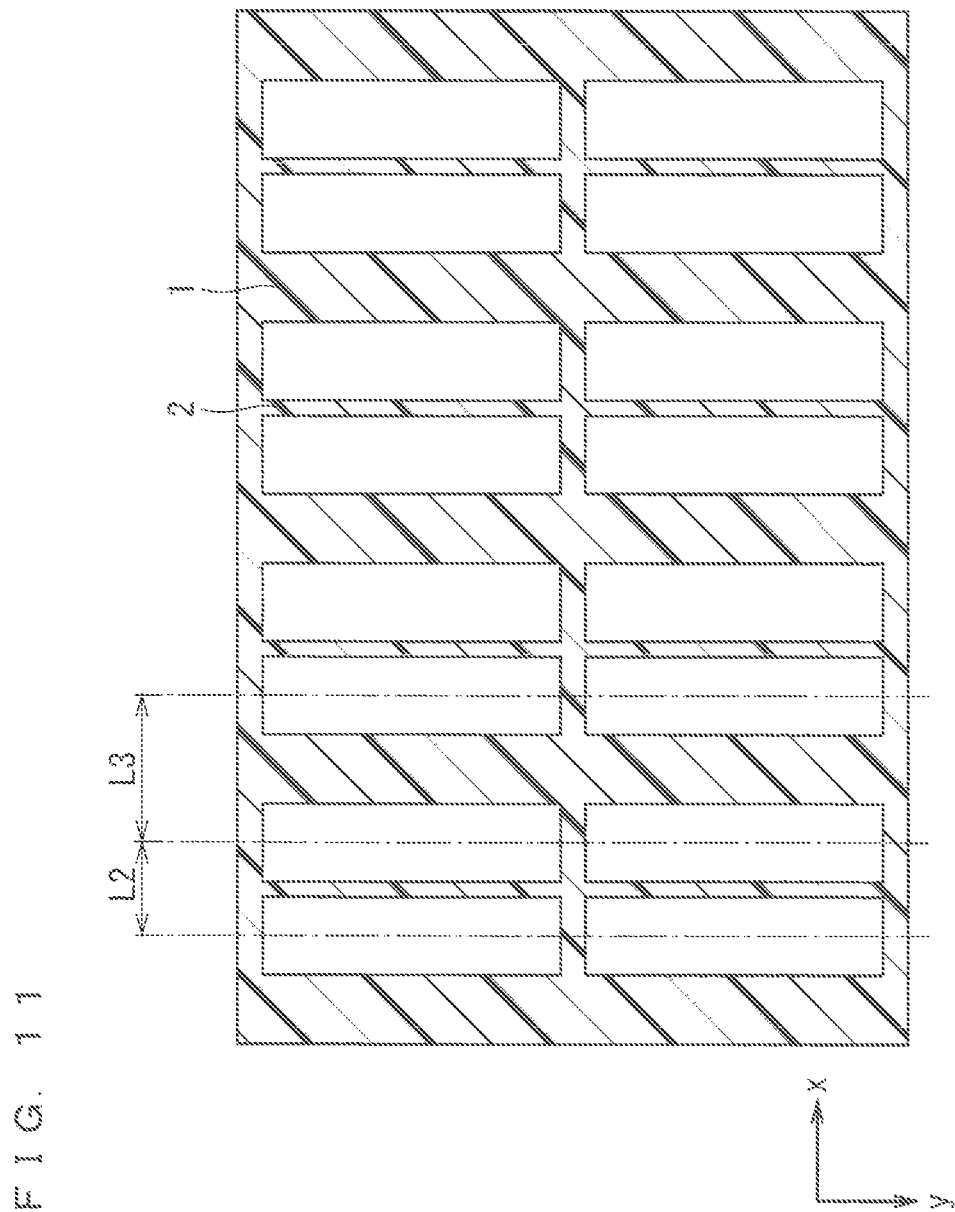
FIG. 11 is a plan view of an arrangement pattern of a light blocking layer in a liquid crystal display panel, where the light blocking layer has regions with different widths.
Figure 12:
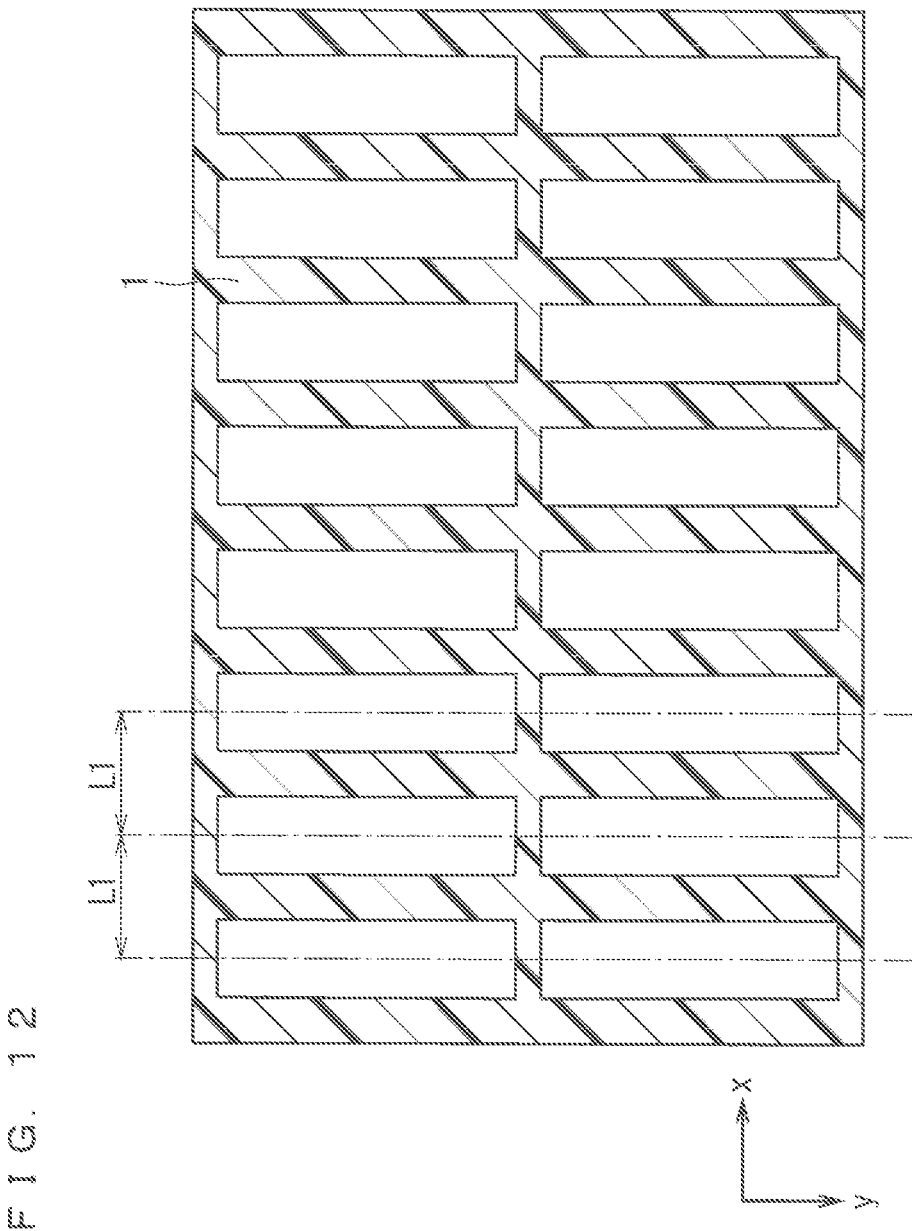
FIG. 12 is a plan view of an arrangement pattern of the light blocking layer in the liquid crystal display panel, where the light blocking layer has regions with the same width.

FIG. 11 is a plan view of an arrangement pattern of the light blocking layer in a liquid crystal display panel, where the light blocking layer has regions with different widths. FIG. 12 is a plan view of an arrangement pattern of the light blocking layer in the liquid crystal display panel, where the light blocking layer has regions with the same width.

FIG. 11 illustrates light blocking layers 1 extending in the y-axis direction and light blocking layers 2 narrower than the light blocking layers 1 in the x-axis direction and extending in the y-axis direction. The light blocking layers 2, which are narrower in the x-axis direction, each correspond to the region of the light blocking layer in the absence of the video signal line 14 between the pixel electrodes 16 next to each other in the x-axis direction.

FIG. 12 illustrates the light blocking layers 1 extending in the y-axis direction. That is, the arrangement pattern of the light blocking layer illustrated in FIG. 12 corresponds to a configuration in which the video signal lines 14 are disposed between all the pixel electrodes 16 next to each other in the x-axis direction.

In the arrangement pattern of the light blocking layer illustrated in FIG. 12, the light blocking layers 1 having the same width are uniformly arranged. Accordingly, the centers of gravity of openings in the individual pixels, i.e., the centers of gravity of regions in the individual pixels, without the light blocking layers 1 are provided at equal intervals. In FIG. 12, the distances between the centers of gravity of the openings next to each other are equal and are denoted by L1.

With reference to the center of gravity of the opening in each pixel, i.e., the center of gravity of the region without the light blocking layers 1 and 2 in each pixel, a comparison is made between the arrangement pattern illustrated in FIG. 11 and the arrangement pattern illustrated in FIG. 12.

The comparison finds that the center of gravity of the opening in each pixel is shifted toward the light blocking layer 2 in the arrangement pattern illustrated in FIG. 11 when compared with the arrangement pattern illustrated in FIG. 12.

Referring to FIG. 11, the distances between the centers of gravity of the openings next to each other are denoted by L2 and L3 different from L2, in an alternate manner L2 is narrower than L3. Thus, the center of gravity of the opening in each pixel is shifted toward the light blocking layer 2.

As described above, the arrangement pattern illustrated in FIG. 11, in which the light blocking layers 1 and 2 having different widths in the x-axis direction are arranged, is configured such that the center of gravity of the opening in each pixel is shifted toward the light blocking layer 2, which is narrower in the x-axis direction. Such a configuration causes a non-uniform distribution of brightness to thus result in visible lines between bright and dark portions, extending in the y-axis direction.

Accordingly, to avoid these visible lines between the bright and dark portions, provided is a technique of intentionally increasing the width of the light blocking layer 2 in the x-axis direction in the absence of the video signal line 14 between the pixel electrodes 16 next to each other in the x-axis direction, so that the light blocking layer 1 in the presence of the video signal line 14 between the pixel electrodes 16 next to each other in the x-axis direction has the same width as the light blocking layer 2 in the absence of the video signal line 14 between the pixel electrodes 16 next to each other in the x-axis direction.

In this case, like the arrangement pattern of the light blocking layer illustrated in FIG. 12, the light blocking layer is configured such that regions having the same width are uniformly arranged. Consequently, the centers of gravity of the openings in the individual pixels are positioned at equal intervals. This reduces the visible lines between the bright and dark portions.

Unfortunately, this method excessively increases the width of each light blocking layer 2 in the x-axis direction, to thus result in a reduction in aperture ratio. This leads to a reduction in brightness.

Meanwhile, one way to prevent the reduction in brightness is increasing the brightness of a backlight. To do this, however, the number of LEDs or the power consumption of the LEDs needs to be increased. Doing so results in increased manufacture cost or increased power consumption.

Alternatively, one way to reduce the visible lines between the bright and dark portions while preventing the reduction in aperture ratio is as follows: placing the TFT for pixel drive and the light blocking layer blocking light in a region with the TFT, in part of the region between the pixels in the absence of the video signal line between the pixel electrodes next to each other; and then making the brightness uniform in the region between the pixels of the pixel electrodes next to each other.

Unfortunately, this method results in a configuration in which the TFT that needs to be connected to the video signal line, and the light blocking layer blocking the light in the region with the TFT are disposed in a position remote from the video signal line, i.e., in a position close to the region between the pixels in the absence of the video signal line between the pixel electrodes next to each other.

Such a configuration enlarges a light-blocking portion created by a wire for establishing a connection between the TFT and the video signal line. This still results in the reduction in aperture ratio.

<Configuration of Liquid Crystal Display>

The following describes an active-matrix liquid crystal display that includes thin film transistors or TFTs, as one example of the liquid crystal display according to the first preferred embodiment. In some embodiments, a liquid crystal display is suitable that includes switching elements other than the TFTs.

Figure 1:
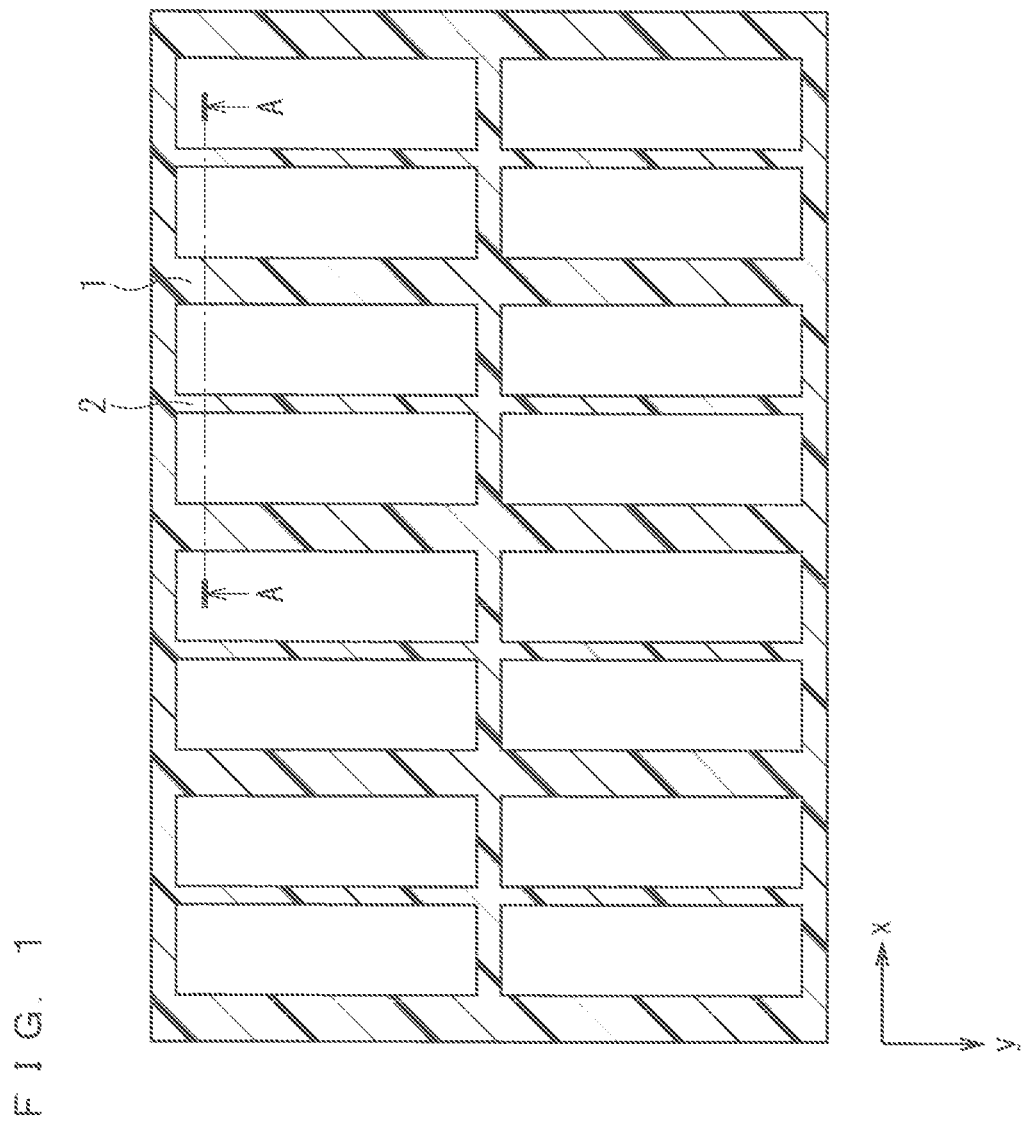
FIG. 1 is a plan view of a configuration for achieving a liquid crystal display according to preferred embodiments.

FIG. 1 is a schematic plan view of a configuration for achieving the liquid crystal display according to the first preferred embodiment. More specifically, FIG. 1 is a plan view of an arrangement pattern of a light blocking layer between a plurality of pixels in a liquid crystal display panel.

As illustrated in FIG. 1, disposed in the liquid crystal display panel are the light blocking layers 1 extending in the y-axis direction, and the light blocking layers 2 narrower than the light blocking layers 1 in the x-axis direction and extending in the y-axis direction.

Figure 2:
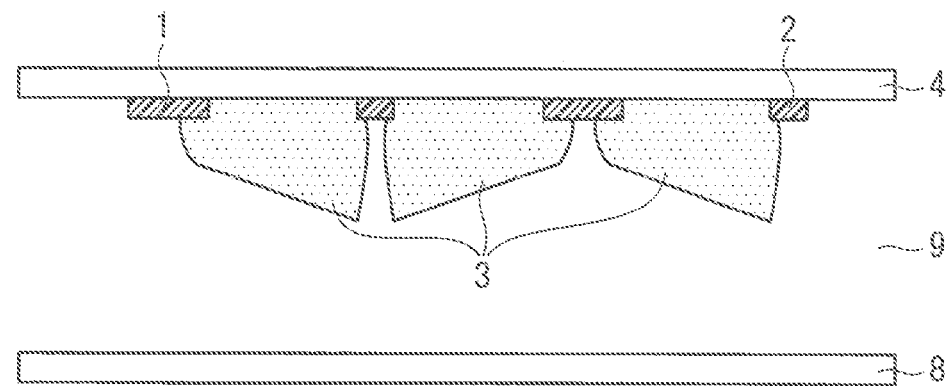
FIG. 2 is a cross-sectional view taken along line A-A in FIG. 1.

FIG. 2 is a cross-sectional view taken along line A-A in FIG. 1.

As illustrated in FIG. 2, the liquid crystal display includes the following: a color filter substrate 4 that is a counter substrate on which a color filter is disposed; the light blocking layers 1 each disposed on the lower surface of the color filter substrate 4; the light blocking layers 2 each disposed on the lower surface of the color filter substrate 4 and spaced away from the light blocking layer 1; colorant layers 3 each disposed on the lower surface of the color filter substrate 4 and provided to overlap a region between the light blocking layer 1 and the light blocking layer 2, i.e., the corresponding pixel; a TFT array substrate 8 provided with an array of the TFTs; and a liquid crystal layer 9 sandwiched between the color filter substrate 4 and the TFT array substrate 8.

The liquid crystal display according to the first preferred embodiment is a dual scanning-line liquid crystal display. Thus, the TFT array substrate 8 is provided with n/2 video signal lines 14 along the y-axis direction such that the pixels in a matrix are partitioned every two columns in the x-axis direction, where the pixels are each expressed by the following mathematical:

$$\text{Pixel } (i,j), \text{ where } i \text{ denotes } 1 \text{ to } m, \text{ and } j \text{ denotes } 1 \text{ to } n \qquad (1).$$

Each video signal line 14 is connected to the TFTs 15 in 2 m pixels positioned at both sides of the video signal line 14 (see FIG. 10).

With reference to the individual rows of a pixel matrix, the scanning signal line 12 and the scanning signal line 13 are provided so as to sandwich n pixels that constitute each row, in the y-axis direction from both sides of the n pixels (see FIG. 10), where the pixel matrix is expressed by the following mathematical:

$$\text{Pixel Matrix } (i,j), \text{ where } i \text{ denotes } 1 \text{ to } m, \text{ and } j \text{ denotes } 1 \text{ to } n \qquad (2).$$

The n pixels, which constitute the individual rows, are partitioned in the x-axis direction by the n/2 video signal lines 14.

With reference to the pixels next to each other in the x-axis direction with the video signal line 14 interposed therebetween, the TFTs 15 connected to the respective pixel electrodes 16 are connected in common to the video signal line 14. In addition, the TFT 15 in each pixel is supplied with a video signal voltage from the video signal line 14.

With reference to the two TFTs 15 within a pair of pixels, one of the TFTs 15 has a gate electrode connected to the scanning signal line 12; and the other of the TFTs 15 has a gate electrode connected to the scanning signal line 13. In addition, the TFT 15 in each pixel is supplied with a scanning signal voltage from the scanning signal line 12 or the scanning signal line 13.

Accordingly, as illustrated in FIG. 10, the positions of the TFTs 15 are different from one another for each row. That is, with reference to the pixels next to each other in the x-axis direction, one of the pixels includes the TFT 15 connected to the scanning signal line 12 and video signal line 14; and the other of the pixels includes the TFT 15 connected to the scanning signal line 13 and video signal line 14.

As already described, the light blocking layers 1 and the light blocking layers 2 are arranged on the lower surface of the color filter substrate 4 in order to prevent the electric-field leak or the light leak due to the misalignment.

The light blocking layers 1 and the light blocking layers 2 are each disposed in a position overlapping, in a plan view, a region in the TFT array substrate 8 in which the scanning signal line 12, the scanning signal line 13, the video signal line 14, or other lines is positioned.

Alternatively, the light blocking layers 1 and the light blocking layers 2 are each disposed in a position overlapping, in a plan view, a region in the TFT array substrate 8 in which the TFT 15 is positioned.

The light blocking layers 1 and the light blocking layers 2 are each a black mask or a black matrix, which is referred to as a BM.

Examples of a material of the BM includes a metal layer containing a material such as a chromium oxide, and a resin layer in which a carbon black, which is a pigment, or a titanium (Ti) black, which is a pigment, is diffused in a resist, i.e., a photosensitive resin. A BM containing such a resin layer is referred to as a resin BM.

The colorant layers 3 are each disposed on the lower surface of the color filter substrate 4, between the light blocking layer 1 and the light blocking layer 2. The colorant layer 3 contains a transparent resin layer in which, for instance, a pigment or dye corresponding to a primary color, i.e., R, G, or B, is diffused in a resist.

Further, a counter electrode containing a transparent conductive film such as a tin-doped indium oxide or indium tin oxide (ITO) is disposed substantially across a display region of the liquid crystal display panel, over the light blocking layers 1, light blocking layers 2, and colorant layers 3. The counter electrode is not shown herein.

The counter electrode generates an electric field between the counter electrode and the pixel electrode in the TFT array substrate 8 to drive a liquid crystal in the liquid crystal layer 9. The pixel electrode is not shown herein.

The counter electrode is electrically connected to a transfer electrode disposed on or near the TFT array substrate 8 with a transfer material interposed therebetween. The transfer material and the transfer electrode are not shown herein.

The counter electrode receives an external signal through the transfer electrode and transfer material. The counter electrode is disposed on or near the TFT array substrate 8 in a transverse-electric-field liquid crystal display, such as an in-plane switching (IPS; a registered trademark) liquid crystal display or a fringe-field-switching (FFS) liquid crystal display. Accordingly, the counter electrode does not need to be disposed on the color filter substrate 4.

Alignment films for the alignment of liquid crystals are disposed on a surface of the color filter substrate 4, the surface facing the liquid crystal layer 9 and on a surface of the TFT array substrate 8, the surface facing the liquid crystal layer 9. The alignment films are not shown herein.

The liquid crystal display according to the first preferred embodiment is configured such that the light blocking layers 1 are each disposed in a position overlapping, in a plan view, a region with the video signal line 14.

The liquid crystal display according to the first preferred embodiment is also configured such that the light blocking layers 2 are each disposed in a region between the pixels next to each other in the x-axis direction, and disposed in a position overlapping, in a plan view, a region without the video signal line 14. The liquid crystal display is also configured such that the light blocking layers 2 are each narrower than the light blocking layer 1.

Each light blocking layer 2, which is disposed in the region without the video signal line 14, is simply required to have such a minimum width as to prevent color mixture.

Established is a gradient of the transmittance within the pixel, specifically, within the region without the light blocking layer 1 and the light blocking layer 2 such that the liquid crystal display panel has a brightness distribution opposite to a brightness distribution thereof based on the width of the light blocking layer 1 and the width of the light blocking layer 2.

In the first preferred embodiment, the distribution of transmittance of the colorant layer 3 is regulated so that the gradient of the transmittance is established within the pixel. Specifically, the thickness of the colorant layer 3 is regulated to make the transmittance in a region adjacent to the light blocking layer 2 lower than that in a region adjacent to the light blocking layer 1.

In other words, the colorant layer 3 is regulated to have a thickness that is greater in the region adjacent to the light blocking layer 2 than that in the region adjacent to the light blocking layer 1.

For example, the colorant layer 3 is regulated to have a tapered thickness that increases gradually from a location with the light blocking layer 1, i.e., the region with the video signal line 14 toward a location with the light blocking layer 2, i.e., the region without the video signal line 14, as illustrated in FIG. 2.

Reference is made to the thickness of the colorant layer 3, changed from the location with the light blocking layer 1 to the location with the light blocking layer 2. The colorant layer 3 is set to have a suitable thickness within the following ranges, in accordance with the degree of the influence on an aperture ratio caused by the difference between the width of the light blocking layer 1 and the width of the light blocking layer 2, where the influence relates to an effect as described later on: for instance, for the colorant layer 3 in the region adjacent to the light blocking layer 2, the colorant layer 3 having a relatively large thickness, the thickness is approximately 10 to 50% larger than an average thickness of the colorant layer 3 in the aforementioned locations; and for the colorant layer 3 adjacent to the light blocking layer 1, the colorant layer 3 having a relatively small thickness, the thickness is approximately 10 to 50% smaller than the average thickness.

Here, the thickness of the colorant layer 3 in the region adjacent to the light blocking layer 2 is set to be approximately 30% larger than the average thickness; and the thickness of the colorant layer 3 in the region adjacent to the light blocking layer 1, approximately 30% smaller than the same.

<Effects of Liquid Crystal Display>

The following describes the effects of the configuration of the liquid crystal display according to the first preferred embodiment.

The light blocking layers 2 are each narrower than the light blocking layer 1. Hence, the light blocking layer 2 has a small influence on the aperture ratio; that is, the liquid crystal display panel has a small area in which the light blocking layer 2 blocks light, and thus the region adjacent to the light blocking layer 2 is certainly seen as a relatively bright region.

However, the colorant layer 3 is set to have a low transmittance in the region adjacent to the light blocking layer 2. Hence, the region adjacent to the light blocking layer 2 has a reduced aperture ratio.

Meanwhile, the light blocking layers 1 are each wider than the light blocking layer 2. Hence, the light blocking layer 1 has a great influence on the aperture ratio; that is, the liquid crystal display panel has a large area in which the light blocking layer 1 blocks light, and thus the region adjacent to the light blocking layer 1 is certainly seen as a relatively dark region.

However, the colorant layer 3 is set to have a high transmittance in the region adjacent to the light blocking layer 1. Hence, the region adjacent to the light blocking layer 1 has an increased aperture ratio.

As described above, the liquid crystal display according to the first preferred embodiment is configured such that the transmittance of the colorant layer 3 in the region without the light blocking layer is regulated to cancel out the influence on the aperture ratio due to the light blocking layers 1 and 2 having different widths. This reduces the non-uniform distribution of brightness due to the light blocking layers 1 and 2 having different widths, in the liquid crystal display panel. Consequently, lines between the bright and dark portions, i.e., streaks of unevenness are unlikely to be seen.

As already described, the liquid crystal display according to the first preferred embodiment is configured such that the magnitude of the transmittance of the colorant layer 3 is relatively varied between the region adjacent to the light blocking layer 1 and the region adjacent to the light blocking layer 2, thereby cancelling out the influence on the aperture ratio due to the light blocking layers 1 and 2 having different widths. The liquid crystal display according to the first preferred embodiment is also configured such that the transmittance in the region adjacent to the light blocking layer 1 or the transmittance in the region adjacent to the light blocking layer 2 is regulated using the colorant layer 3, so that the non-uniform distribution of brightness is reduced.

For instance, in the region adjacent to the light blocking layer 1 and the region adjacent to the light blocking layer 2, index regions in which transmittances are relatively compared to each other have the same width from the boundary between the colorant layer 3 and the light blocking layer 1 or the boundary between the colorant layer 3 and the light blocking layer 2, to a predetermined distance. With respect to these index regions, the transmittance of the colorant layer 3 is set such that the non-uniform distribution is sufficiently reduced.

Specifically, reference is made to a transmittance that is basically uniform within an entire single pixel region. When a region is provided that has locally different transmittances mainly in only the region close to the light blocking layer 1 or the region close to the light blocking layer 2, an index of the aforementioned predetermined distance is within a range of approximately one-third of the width of each pixel in the region close to the light blocking layer 1 or close to the light blocking layer 2.

With reference to the transmittances within these index regions, the colorant layer 3 has portions with transmittances different from each other so that the influence on the aperture ratio due to the light blocking layers 1 and 2 having different widths is canceled out. This sufficiently reduces the non-uniform distribution of transmittance. Consequently, the desired effect is achieved that is described in the first preferred embodiment.

The transmittances within these index regions are relatively compared on the basis of averages thereof. When the average transmittances are different from each other, the same effect is achieved.

When the transmittance is varied in a width direction of the pixel region as a whole; that is, when the transmittance is gradually or stepwise varied so as to decrease from the region close to the light blocking layer 1 toward the region close to the light blocking layer 2, the pixel is divided, in the width direction, into two regions: one including the light blocking layer 1; and the other including the light blocking layer 2. Then, an index of the predetermined distance is within a range of a half of the width of the pixel corresponding to each region as divided.

In particular, reference is made to the transmittances within these index regions. with reference to at least the averages, when the transmittances are different from each other, so that the influence on the aperture ratio due to the light blocking layers 1 and 2 having different widths is canceled out, the non-uniform distribution of transmittance is sufficiently reduced. Consequently, the desired effect as described in the first preferred embodiment is achieved.

Such a distribution of the transmittance is equivalent to the fact that provided that the predetermined distance is within the range of approximately one-third of the width of the pixel, the pixel region has portions with transmittances different from each other, so that the influence on the aperture ratio due to the light blocking layers 1 and 2 having different widths is canceled out. Accordingly, the desired effect as described in the first preferred embodiment is obviously achieved.

Figure 3:
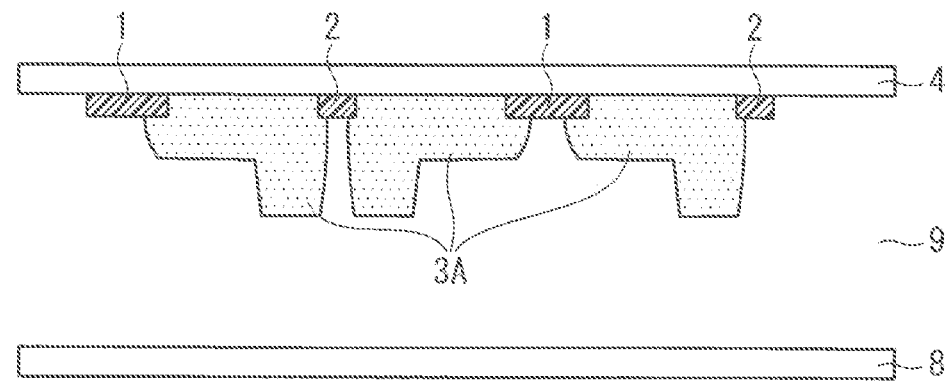
FIG. 3 is another cross-sectional view taken along line A-A in FIG. 1.

FIG. 3 is another cross-sectional view taken along line A-A in FIG. 1.

As illustrated in FIG. 3, the liquid crystal display includes the following: the color filter substrate 4; the light blocking layers 1; the light blocking layers 2; the colorant layers 3A each disposed on the lower surface of the color filter substrate 4, in a region between the light blocking layer 1 and the light blocking layer 2; the TFT array substrate 8; and the liquid crystal layer 9.

The colorant layers 3A each contains a transparent resin layer in which, for instance, a pigment or dye of a primary color corresponding to R, G, or B is diffused in a resist.

In the aspect illustrated in FIG. 3, a distribution of transmittance of each colorant layer 3A is regulated so that a gradient of the transmittance is established within the pixel. More specifically, the thickness of each colorant layer 3A is regulated so as to increase stepwise from the region adjacent to the light blocking layer 1 toward the region adjacent to the light blocking layer 2, thereby making the transmittance in the region adjacent to the light blocking layer 2 lower than the transmittance in the region adjacent to the light blocking layer 1.

Regulating the thickness of the colorant layer 3A for stepwise increase causes differences in color purity and transmittance within a single pixel. Nevertheless, the single pixel, when practically viewed, is observed as a pixel having average color purity and average transmittance.

In addition, with reference to the liquid crystal display in its entirety, regulating the thickness of the colorant layer 3A for stepwise increase achieves the same effect as the adjustment of the colorant layer 3 to be tapered, without a bad influence on the color purity or transmittance.

Employed in patterning the colorant layer can be a half-tone technique, which is known. This half-tone technique is a patterning method using a mask for tone exposure. This method relatively facilitates the formation of the colorant layer having partly different thicknesses.

It is noted that a high transmittance of the colorant layer results in reduced color purity and improved white brightness, whereas a low transmittance of the colorant layer results in improved color purity and reduced white brightness.

In view of such a relationship, a typical liquid crystal display is designed to have a transmittance so as to have desired color purity and desired white brightness.

Accordingly, the thickness of the colorant layer is desirably regulated such that the liquid crystal display in its entirety has desired color purity and desired white brightness.

In the first preferred embodiment, the colorant layer of each of R, G, and B per pixel has a non-uniform thickness, i.e., an inclined thickness. To achieve the desired color purity and desired white brightness in the liquid crystal display in its entirety, an average of the transmittance of the colorant layer of each of R, G, and B per pixel is regulated so as to correspond to a transmittance that achieves the desired color purity and desired white brightness in the liquid crystal display in its entirety.

Specifically, if the liquid crystal display according to the first preferred embodiment is configured such that the colorant layer of each of R, G, and B has a uniform thickness, like a common liquid crystal display, calculated is a transmittance of the colorant layer of each of R, G, and B, where the transmittance achieves the desired color purity and desired white brightness in the liquid crystal display in its entirety.

Then, a thickness for the colorant layer of each of R, G, and B to achieve such a transmittance is specified as a design thickness of the colorant layer of each of R, G, and B.

The colorant layer is thicker than the design thickness in the region without the video signal line 14, whereas the colorant layer is thinner than the design thickness in the region with the video signal line 14.

When the thickness is regulated with high precision, an average of the thickness of the colorant layer of each of R, G, and B per pixel is set to be equal to the design thickness of the colorant layer of each of R, G, and B, which achieves the desired color purity and desired white brightness.

Setting the thickness of each colorant layer, as described above, locally provides, within the single pixel, two regions: one including a region with a higher transmittance than the transmittance achieving the desired color purity or desired white brightness; and the other including a region with a lower transmittance than such a transmittance. This setting particularly reduces a bad influence on the properties of color purity and the properties of white brightness.

Second Preferred Embodiment

The following describes a liquid crystal display and a method for adjusting the liquid crystal display, according to a second preferred embodiment. The same elements as those described in the first preferred embodiment are denoted by the same symbols, and thus are not detailed herein.

<Configuration of Liquid Crystal Display>

The second preferred embodiment describes another method for regulating the distribution of transmittance of each colorant layer. The method includes forming openings in the colorant layer, and then adjusting, for instance, the position of the opening or regulating the area of the opening.

Although the second preferred embodiment illustrates forming the openings to adjust a region in which the colorant layer is disposed, any method can be used in the adjustment of the region in which the colorant layer is disposed. For example, the colorant layer may be partly formed in only a region having a desirably low transmittance.

Figure 4:
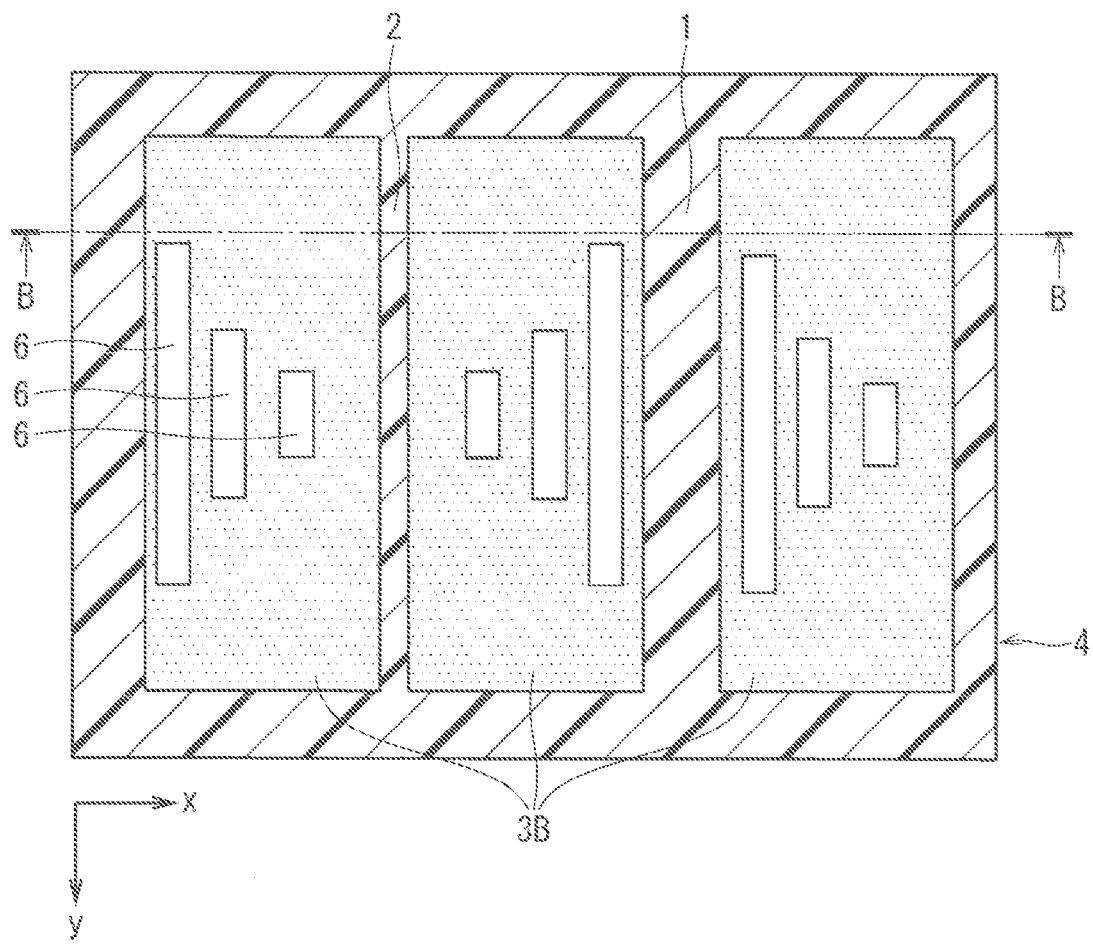
FIG. 4 is a schematic plan view of a configuration for achieving a liquid crystal display according to a preferred embodiment.

FIG. 4 is a schematic plan view of a configuration for achieving the liquid crystal display according to the second preferred embodiment. Specifically, FIG. 4 is a plan view of a color filter substrate in a liquid crystal display panel.

As illustrated in FIG. 4, the color filter substrate 4 is provided with the light blocking layers 1 extending in the y-axis direction, and the light blocking layers 2 narrower than the light blocking layers 1 in the x-axis direction and extending in the y-axis direction.

As illustrated in FIG. 4, the color filter substrate 4 is provided with colorant layers 3B in regions without the light blocking layers 1 and 2. The colorant layers 3B each have openings 6.

The openings 6 of each colorant layer 3B are arranged in a region adjacent to a location in which the light blocking layer 1 is disposed, i.e., in the region adjacent to the region with the video signal line 14.

Figure 5:
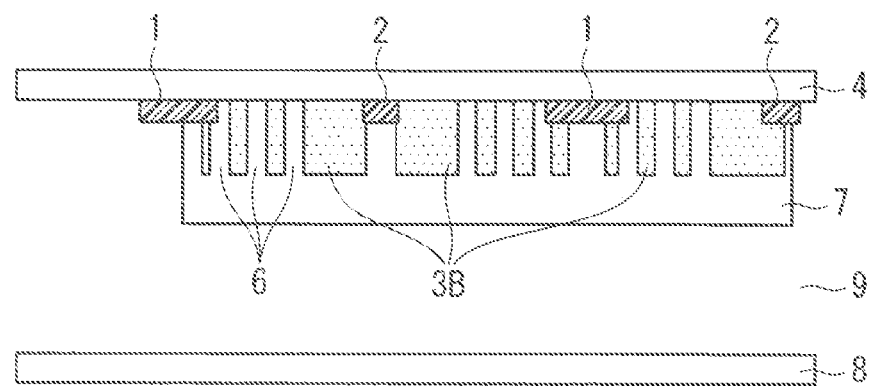
FIG. 5 is a cross-sectional view taken along line B-B in FIG. 4.

FIG. 5 is a cross-sectional view taken along line B-B in FIG. 4.

As illustrated in FIG. 5, the liquid crystal display includes the following: the color filter substrate 4; the light blocking layers 1; the light blocking layers 2; the colorant layers 3B each disposed on the lower surface of the color filter substrate 4, in a region between the light blocking layer 1 and the light blocking layer 2; the TFT array substrate 8; the liquid crystal layer 9; a planarization layer (overcoat layer) 7 disposed on the lower surfaces of the colorant layers 3B. The openings 6 of the colorant layers 3B are filled with the planarization layer 7.

The liquid crystal display according to the second preferred embodiment is configured such that each colorant layer 3B partly has the openings 6 as illustrated in FIGS. 4 and 5. Such a configuration achieves the same effect as that in the first preferred embodiment.

Specifically, the openings 6 of the colorant layer 3B are arranged in the region adjacent to the light blocking layer 1, the region corresponding to the region with the video signal line 14.

At this time, the planarization layer 7 having a thickness of, for instance, 1 μm or greater is desirably disposed on the lower surfaces of the colorant layers 3B, as illustrated in FIG. 5.

The planarization layer 7 is a transparent resin film applied to the lower surfaces of the colorant layers 3B. In the presence of the planarization layer 7, the openings 6 of each colorant layer 3B are also filled with the planarization layer 7, as illustrated in FIG. 5. The lower surface of the planarization layer 7 is then planarized.

In the presence of the openings 6 of the colorant layer 3B, the distance between the substrates, i.e., a cell gap in a location with the openings 6 of the colorant layer 3B is different from that in a location without the openings 6 of the colorant layer 3B. This causes variations in transmittance of the colorant layer 3B.

The planarization layer 7 reduces this variations in transmittance caused by the differences in the cell gap. This enables the transmittance of the colorant layer 3B to be regulated using the openings 6, regardless of the variations in transmittance due to the differences in the cell gap, thereby facilitating the regulation of the transmittance.

The opening 6 of the colorant layer 3B has a stair-shape at the end of the opening 6. Such a shape reduces misalignment.

In addition, the openings 6 of the colorant layers 3B are simultaneously formed in a process of patterning the colorant layers 3B. This enables the openings 6 to be formed without increased steps and with relative ease.

The liquid crystal display according to the second preferred embodiment includes the colorant layers 3B each having the openings 6. In the liquid crystal display, the position and area of each opening 6 or other parameters relating to the shape of each opening 6 is adjusted for regulating a distribution of transmittance of each colorant layer 3B. In the second preferred embodiment, the adjustment is desirably made, like in the first preferred embodiment, such that desired color purity and desired white brightness are achieved in the liquid crystal display in its entirety.

In the second preferred embodiment, the colorant layer 3B of each of R, G, and B per pixel partly has the openings 6, so that a gradient of the transmittance is established. To achieve the desired color purity and desired white brightness in the liquid crystal display in its entirety, an average of the transmittance of the colorant layer 3B per pixel including the region with the openings 6 is regulated so as to correspond to a transmittance that achieves the desired color purity and desired white brightness in the liquid crystal display in its entirety.

Specifically, in the absence of the openings 6 in the colorant layer 3B of each of R, G, and B, like a common liquid crystal display, calculated is a transmittance of the colorant layer 3B of each of R, G, and B, where the transmittance achieves the desired color purity and desired white brightness in the liquid crystal display in its entirety.

Then, a thickness for the colorant layer 3B of each of R, G, and B to have such a transmittance is specified as a design thickness of the colorant layer 3B of each of R, G, and B.

To prevent an average transmittance of the colorant layer 3B from being high in the openings 6, the thickness of the colorant layer 3B including the light blocking layer 1 and region adjacent to the light blocking layer 1 in which the openings 6 are disposed, and further including the light blocking layer 2 and region adjacent to the light blocking layer 2, is greater than the design thickness while being uniform in a region, as a whole, in which the colorant layer 3B is formed.

When the thickness is regulated with high precision, an average of the thickness of the colorant layer 3B of each of R, G, and B per pixel in FIG. 5 is set to be equal to the design thickness of the colorant layer of each of R, G, and B, which achieves the desired color purity and desired white brightness. Specifically, when the thickness of the colorant layer 3B is greater than the design thickness in the entire region in which the colorant layer 3B is disposed, the thickness of the colorant layer 3B is regulated in accordance with the rate of the openings 6 to the area of the colorant layer 3B, where the thickness of the colorant layer 3B is zero at this rate. The average of the thickness of the colorant layer 3B of each of R, G, and B per pixel is regulated in this way.

Forming the openings 6 of the colorant layer 3B as described above locally provides, within a single pixel, two regions: one including a region with a higher transmittance than the transmittance achieving the desired color purity or desired white brightness; and the other including a region with a lower transmittance than such a transmittance. This formation particularly reduces a bad influence on the properties of color purity and the properties of white brightness.

The liquid crystal display according to the second preferred embodiment is configured such that the colorant layers 3B each have an uniform thickness. In some embodiments, the colorant layers 3B each may have a non-uniform thickness, like the colorant layer 3 in the first preferred embodiment; that is, the location in which the light blocking layer 1 is disposed, i.e., the region with the video signal line 14 has one thickness, and the location in which the light blocking layer 2 is disposed, i.e., the region without the video signal line 14 has another thickness.

Doing so enables a wide range of regulation of the transmittance of each colorant layer.

Third Preferred Embodiment

The following describes a liquid crystal display and a method for adjusting the liquid crystal display, according to a third preferred embodiment. The same elements as those described in the first and second preferred embodiments are denoted by the same symbols, and thus are not detailed herein.

<Configuration of Liquid Crystal Display>

The third preferred embodiment describes how to establish a gradient of a transmittance within a pixel through the use of a relationship between a cell gap and the transmittance of the liquid crystal layer. The transmittance of the liquid crystal layer herein is a transmittance based on a relationship between the liquid crystal layer and a polarizer.

Figure 6:
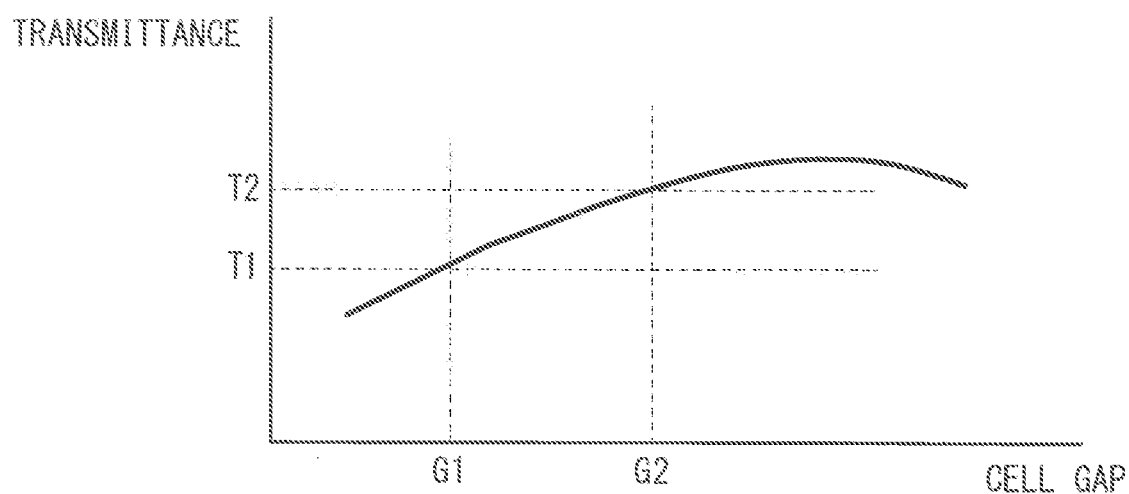
FIG. 6 is a graph illustrating a relationship between a cell gap and the transmittance of a liquid crystal layer.

FIG. 6 is a graph illustrating the relationship between the cell gap and the transmittance of the liquid crystal layer. In FIG. 6, the vertical axis indicates the transmittance of the liquid crystal layer; and the horizontal axis, the cell gap.

In FIG. 6, G1 denotes the cell gap in the region without the video signal line 14. In addition, G2 denotes the cell gap in the region with the video signal line 14.

In FIG. 6, T1 denotes the transmittance in the region without the video signal line 14. In addition, T2 denotes the transmittance in the region with the video signal line 14.

FIG. 6 shows the following relationship within a range of the cell gap in a common liquid crystal display (LCD): when the cell gap increases from G1 to G2 in FIG. 6, the transmittance of the liquid crystal layer increases from T1 to T2 in FIG. 6. It is noted that the "transmittance of the liquid crystal layer" herein is a transmittance during a bright display in the liquid crystal display panel.

Accordingly, provided is a gradient of the thickness of the cell gap such that the cell gap in the region with the video signal line 14 is greater than the cell gap in the region without the video signal line 14.

Doing so provides, within the pixel, a gradient in a direction in which the transmittance of the liquid crystal layer in the region without the video signal line 14 is lower than the transmittance of the liquid crystal layer in the region with the video signal line 14.

In this way, the gradient of the transmittance within the pixel achieves the same effect as that in the first preferred embodiment.

Figure 7:
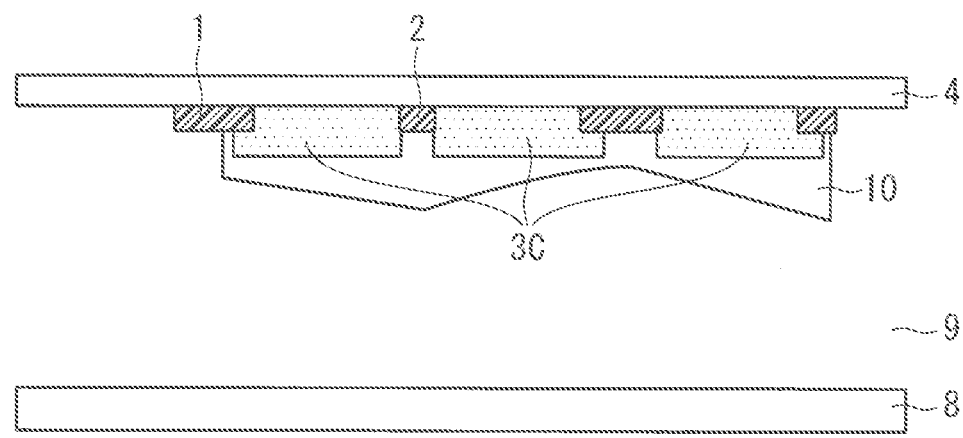
FIG. 7 is a schematic cross-sectional view of a configuration of a liquid crystal display according to a preferred embodiment in the presence of a gradient in the cell gap.

FIG. 7 is a schematic cross-sectional view of a configuration of the liquid crystal display according to the third preferred embodiment in the presence of the gradient in the cell gap.

As illustrated in FIG. 7, the liquid crystal display includes the following: the color filter substrate 4; the light blocking layers 1; the light blocking layers 2; colorant layers 3C each disposed on the lower surface of the color filter substrate 4, in the region between the light blocking layer 1 and the light blocking layer 2; the TFT array substrate 8; the liquid crystal layer 9; and a gap control layer 10 disposed on the lower surfaces of the colorant layers 3C.

The colorant layers 3C each have a uniform thickness. The gap control layer 10 is thinner in each light blocking layer 1 corresponding to the region with the video signal line 14, and in the region adjacent to the light blocking layer 1, than in each light blocking layer 2 corresponding to the region without the video signal line 14, and in the region adjacent to the light blocking layer 2.

In the configuration illustrated in FIG. 7, the gap control layer 10 has such a non-uniform thickness; consequently, established is the gradient of the cell gap, i.e., a gradient in which the transmittance of the liquid crystal layer in the region without the video signal line 14 is reduced. This achieves the same effect as in the first preferred embodiment.

Reference is now made to the thickness of the cell gap, having a gradient from the location in which the light blocking layer 1 is disposed to the location in which the light blocking layer 2 is disposed, where the gradient is established as a result of the non-uniform thickness of the gap control layer 10. The cell gap is set to have a suitable thickness within the following ranges, in accordance with the degree of the influence on the aperture ratio caused by the difference between the width of the light blocking layer 1 and the width of the light blocking layer 2, where the influence relates to the aforementioned effect, and further in accordance with the retardation of the liquid crystal layer 9, where the retardation relates to a correlation between the cell gap and the transmittance: for instance, for the cell gap in the region adjacent to the light blocking layer 1, the cell gap having a relatively large thickness, the thickness is approximately 10 to 50% larger than an average of the cell gap in the aforementioned regions; and for the cell gap in the region adjacent to the light blocking layer 2, the cell gap having a relatively small thickness, the thickness is approximately 10 to 50% smaller than the average.

In addition, the aforementioned cell gap is regulated within a rage in which a positive correlation is established between the magnitude of the thickness of the cell gap and the magnitude of the transmittance, i.e., for example, within a range from G1 to G2 in the graph illustrated in FIG. 6.

Here, the average of the cell gap is set to be, for instance, 4 μm within the range from G1 to G2. In this case, the cell gap in the region adjacent to the light blocking layer 1 is set to have a thickness of 4.8 μm, which is approximately 20% greater than the average; and the cell gap in the region adjacent to the light blocking layer 2 is set to have a thickness of 3.2 μm, which is approximately 20% smaller than the average.

Figure 8:
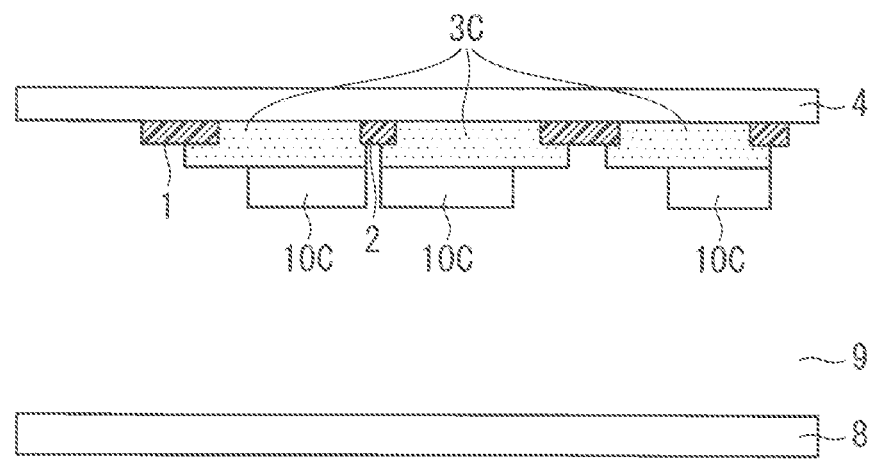
FIG. 8 is a schematic cross-sectional view of another configuration of the liquid crystal display in the presence of the gradient in the cell gap.

FIG. 8 is a schematic cross-sectional view of another configuration of the liquid crystal display in the presence of the gradient in the cell gap.

As illustrated in FIG. 8, the liquid crystal display includes the following: the color filter substrate 4; the light blocking layers 1; the light blocking layers 2; the colorant layers 3C; the TFT array substrate 8; the liquid crystal layer 9; and gap control layers 10C each partly disposed on the lower surface of the colorant layer 3C.

The gap control layers 10C are each disposed on the lower surface of the colorant layer 3C, in only the region adjacent to the light blocking layer 2, which corresponds to the region without the video signal line 14.

In the configuration illustrated in FIG. 8, the gap control layer 10C establishes the gradient in the cell gap, i.e., a gradient in which the transmittance of the liquid crystal layer in the region without the video signal line 14 is reduced. This achieves the same effect as that in the first preferred embodiment.

Figure 9:
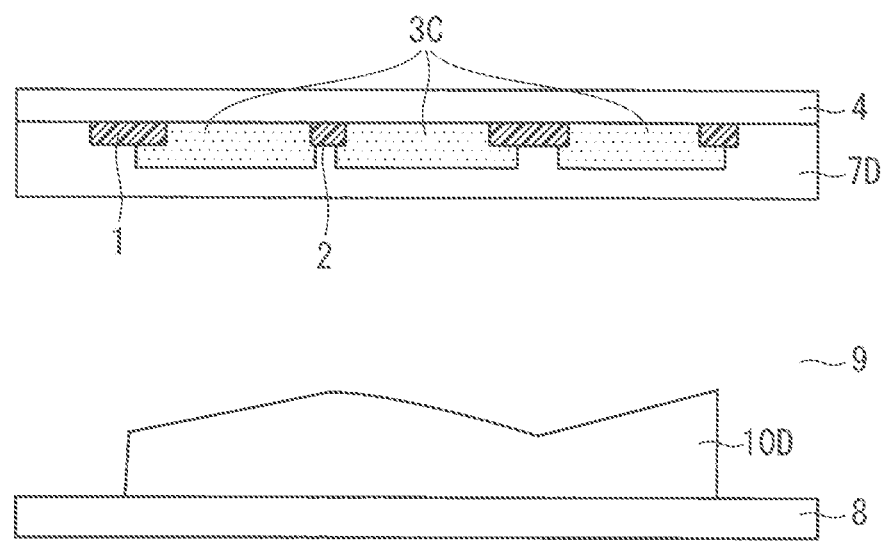
FIG. 9 is a schematic cross-sectional view of still another configuration of the liquid crystal display in the presence of the gradient in the cell gap.

FIG. 9 is a schematic cross-sectional view of still another configuration of the liquid crystal display in the presence of the gradient in the cell gap.

As illustrated in FIG. 9, the liquid crystal display includes the following: the color filter substrate 4; the light blocking layers 1; the light blocking layers 2; the colorant layers 3C; the TFT array substrate 8; the liquid crystal layer 9; a planarization layer 7D disposed on the lower surfaces of the colorant layers 3C; and a gap control layer 10D disposed on the upper surface of the TFT array substrate 8.

The planarization layer 7D is disposed over the light blocking layers 1, the light blocking layers 2, and the colorant layers 3C. In addition, the planarization layer 7D is planarized.

The gap control layer 10D is an organic film, for example. The gap control layer 10D is thinner in a region overlapping, in a plan view, the region with the video signal line 14, than in a region overlapping, in a plan view, the region without the video signal line 14.

In the configuration illustrated in FIG. 9, the gradient in the cell gap is established as a result of the non-uniform thickness of the gap control layer 10D, i.e., the gradient in which the transmittance of the liquid crystal layer in the region without the video signal line 14 is reduced. This achieves the same effect as that in the first preferred embodiment.

It is noted that the gap control layer 10D, which is disposed on the upper surface of the TFT array substrate 8, may be an inorganic film such as a SiN film. In this case, the inorganic film is a single-layer film or a multi-layer film; and at least one layer of the inorganic film is patterned to have a stepped shape.

Doing so relatively facilitates forming the gap control layer 10D that is thick in the region overlapping the region without the video signal line 14.

The liquid crystal display according to the third preferred embodiment is configured such that the thickness of each colorant layer 3C is uniform. In some embodiments, the thickness of each colorant layer 3C may be non-uniform; that is, the location in which the light blocking layer 1 is disposed, i.e., the region with the video signal line 14 has one thickness, and the location in which the light blocking layer 2 is disposed, i.e., the region without the video signal line 14 has another thickness, like the colorant layers described in one of the aforementioned preferred embodiments, for instance, like the colorant layers 3 described in the first preferred embodiment.

Such a non-uniform thickness enables a wide range of regulation of a total transmittance of the transmittance of the liquid crystal layer and the transmittance of the colorant layer.

Although the aforementioned preferred embodiments illustrate that the light blocking layers 1 and the light blocking layers 2 are alternately arranged in the x-axis direction, the arrangement of the light blocking layers 1 and light blocking layers 2 is not limited to the aforementioned aspect.

That is, the light blocking layers 1 may be continuously arranged in the x-axis direction, or the light blocking layer 2 may be continuously arranged in the x-axis direction. In this case, the following are simply satisfied: the transmittance of each colorant layer in the region adjacent to the light blocking layer 2 is lower than the transmittance of each colorant layer in the region adjacent to the light blocking layer 1, or the transmittance of the liquid crystal layer in the region adjacent to the light blocking layer 2 is lower than the transmittance of the liquid crystal layer in the region adjacent to the light blocking layer 1.

The aforementioned preferred embodiments describe that the gap control layer 10, gap control layer 10C, or gap control layer 10D, which is used for establishing the gradient in the cell gap, is the organic film or inorganic film. More specifically, an example of the organic film is desirably a photosensitive, transparent resin film.

Such a transparent resin film to be applied undergoes patterning to form the gap control layer 10, gap control layer 10C or gap control layer 10D, which includes the photosensitive, transparent resin film.

In the patterning, a photosensitive resin can be used as the transparent resin film. In addition, the patterning can be performed through a half-tone technique, which is known. This half-tone technique is a patterning method using a mask for tone exposure. This technique relatively facilitates the formation of the gap control layer 10, gap control layer 10C, or gap control layer 10D having partly different thicknesses.

Effects of Aforementioned Preferred Embodiments

The following describes effects of the aforementioned preferred embodiments. Although these effects are based on specific configurations that are illustrated in the above-described preferred embodiments, to an extent that like effects are obtained, these specific configurations may be replaced with different specific embodiments that are illustrated in the specification.

The replacement may be done over several preferred embodiments. That is, combinations of the individual configurations, which are illustrated in the different preferred embodiments, may bring like effects.

The liquid crystal display according to the aforementioned preferred embodiment includes a plurality of pixels, a light blocking layer, and the colorant layers 3. The plurality of pixels are arranged in a liquid crystal display panel. The light blocking layer is disposed between the plurality of pixels in a plan view. The colorant layers 3 are provided to overlap the individual pixels in a plan view. The light blocking layer includes a first region and a second region. Here, the light blocking layer 1 corresponds to the first region of the light blocking layer. Further, the light blocking layer 2 corresponds to the second region of the light blocking layer. The light blocking layer 2 is narrower than the light blocking layer 1 in a plan view. Further, the colorant layers 3 each have a transmittance lower in the region adjacent to the light blocking layer 2 than a transmittance in the region adjacent to the light blocking layer 1.

Such a configuration prevents the reduction in aperture ratio and reduces the visible lines between the bright and dark portions. In specific, regulating the transmittance of the colorant layer 3 cancels out the influence on the aperture ratio due to the light blocking layers having different widths. In other words, the transmittance of the colorant layer 3 is set to be high in the region adjacent to the light blocking layer 1, and is set to be low in the region adjacent to the narrower light blocking layer 2. This reduces the non-uniform distribution of brightness due to the light blocking layers 1 and 2 having different widths, in the liquid crystal display panel. Consequently, the lines between the bright and dark portions are unlikely to be seen. This configuration also achieves the dual-scanning-line liquid crystal display having a high transmittance. The liquid crystal display, which has such a high transmittance, enables reduced LEDs for the backlight, and also enables reduced power consumption of the liquid crystal display. This configuration reduces driving ICs, thereby achieving low cost.

Different configurations illustrated in the specification, other than the above configurations may be omitted as necessary. That is, the above configurations alone bring the above-described effects.

However, the above configurations can additionally include at least one of the different configurations illustrated in the specification as necessary; that is, the above configurations can additionally include the different configurations illustrated in the specification, which are excluded from these configurations. Such additionally included configurations still bring the aforementioned effects.

In the aforementioned preferred embodiment, the colorant layers 3 are each thicker in the region adjacent to the light blocking layer 2 than in the region adjacent to the light blocking layer 1. In such a configuration, the colorant layer 3 is thin in the region adjacent to the light blocking layer 1, and is thick in the region adjacent to the narrower light blocking layer 2. This reduces the non-uniform distribution of brightness due to the light blocking layers 1 and 2 having different widths, in the liquid crystal display panel. Consequently, the lines between the bright and dark portions are unlikely to be seen. Further, this configuration is relatively, readily established by the half-tone technique, which is known, i.e., by application of a tone exposure technique.

In the aforementioned preferred embodiment, the colorant layers 3 each have a thickness that increases gradually from the region adjacent to the light blocking layer 1 toward the region adjacent to the light blocking layer 2. In such a configuration, the thickness of the colorant layer 3 is small in the region adjacent to the light blocking layer 1, and the thickness increases gradually from the region adjacent to the light blocking layer 1 toward the region adjacent to the light blocking layer 2. This reduces the non-uniform distribution of brightness due to the light blocking layers 1 and 2 having different widths, in the liquid crystal display panel. Consequently, the lines between the bright and dark portions are unlikely to be seen.

In the aforementioned preferred embodiment, the colorant layers 3A each have a thickness that increases stepwise from the region adjacent to the light blocking layer 1 toward the region adjacent to the light blocking layer 2. In such a configuration, the colorant layer 3A is thin in the region adjacent to the light blocking layer 1, and is thick in the region adjacent to the narrower light blocking layer 2. This reduces the non-uniform thickness of brightness due to the light blocking layers 1 and 2 having different widths, in the liquid crystal display panel. Consequently, the lines between the bright and dark portions are unlikely to be seen.

In the aforementioned preferred embodiment, the colorant layers 3B each have the openings 6 in the region adjacent to the light blocking layer 1. In such a configuration, the colorant layer 3B is set to have a high transmittance in the region adjacent to the light blocking layer 1, and is set to have a low transmittance in the region adjacent to the narrower light blocking layer 2. This reduces the non-uniform thickness of brightness due to the light blocking layers 1 and 2 having different widths, in the liquid crystal display panel. Consequently, the lines between the bright and dark portions are unlikely to be seen. Further, in such a configuration, the design of a mask for forming the colorant layer is changed through a process of forming a colorant-layer-cut pattern of a color filter substrate, where the process is generally used in a translucent liquid crystal display. The colorant layers 3B, which are provided through this change in design, are relatively easy to be formed.

In the aforementioned preferred embodiment, the liquid crystal display includes the planarization layer 7 over the colorant layers 3B, the planarization layer 7 filling the openings 6 of each colorant layer 3B. In such a configuration, the planarization layer 7 reduces a difference between the transmittance of the colorant layer 3B in the location with the openings 6 of the colorant layer 3B, and the transmittance of the colorant layer 3B in the location without the openings 6 of the colorant layer 3B. This enables the transmittance of the colorant layer 3B to be regulated using the openings 6, regardless of the variations in transmittance due to the differences in the cell gap, thereby facilitating the regulation of the transmittance. Further, the opening 6 of the colorant layer 3B has a stair-shape at the end of the opening 6. Such a shape reduces the misalignment.

In the aforementioned preferred embodiment, the liquid crystal display includes the plurality of pixels, the light blocking layer, and the gap control layer 10. The plurality of pixels are arrange in the liquid crystal display panel. The light blocking layer is disposed between the plurality of pixels in a plan view. The gap control layer 10 is provided to overlap at least each of the pixels in a plan view. The light blocking layer includes the light blocking layer 1 and the light blocking layer 2. The light blocking layer 2 is narrower than the light blocking layer 1 in a plan view. The gap control layer 10 is thicker in the region adjacent to the light blocking layer 2 than in the region adjacent to the light blocking layer 1.

Such a configuration prevents the reduction in aperture ratio and the visible lines between the bright and dark portions. In specific, regulating the thickness of the gap control layer 10 cancels out the influence on the aperture ratio due to the light blocking layers 1 and 2 having different widths. That is, the gap control layer 10 is thin in the region adjacent to the light blocking layer 1, and is thick in the region adjacent to the narrower light blocking layer 2. This reduces the non-uniform distribution of brightness due to the light blocking layers 1 and 2 having different widths, in the liquid crystal display panel. Consequently, the lines between the bright and dark portions are unlikely to be seen. Further, if the colorant layer has a limited thickness or a limited shape, regulating the thickness of the gap control layer 10 would still prevent the reduction in aperture ratio and reduce the visible lines between the bright and dark portions.

Different configurations illustrated in the specification, other than the above configurations may be omitted as necessary. That is, the above configurations alone bring the above-described effects.

However, the above configurations can additionally include at least one of the different configurations illustrated in the specification as necessary; that is, the above configurations can additionally include the different configurations illustrated in the present specification, which are excluded from these configurations. Such additionally included configurations still bring the above-described effects.

In the aforementioned preferred embodiment, the gap control layers 10C are each disposed in only the region adjacent to the light blocking layer 2. In such a configuration, the region adjacent to the light blocking layer 1 has no gap control layer 10C; and the region adjacent to the narrower light blocking layer 2 has the gap control layer 10C. This reduces the non-uniform distribution of brightness due to the light blocking layers 1 and 2 having different widths, in the liquid crystal display panel. Consequently, the lines between the bright and dark portions are unlikely to be seen.

In the aforementioned preferred embodiment, the liquid crystal display includes the color filter substrate 4 and an array substrate. The color filter substrate 4 and the array substrate sandwich the liquid crystal layer 9. Here, the TFT array substrate 8 corresponds to the array substrate. The light blocking layer is disposed on a surface of the color filter substrate 4, the surface facing the liquid crystal layer 9. The gap control layer 10 is disposed on the surface of the color filter substrate 4, the surface facing the liquid crystal layer 9. In such a configuration, regulating the thickness of the gap control layer 10 cancels out the influence on the aperture ratio due to the light blocking layers 1 and 2 having different widths.

In the aforementioned preferred embodiment, the liquid crystal display includes the color filter substrate 4 and TFT array substrate 8 that sandwich the liquid crystal layer 9. The light blocking layer is disposed on the surface of the color filter substrate 4, the surface facing the liquid crystal layer 9. The gap control layer 10D is disposed on a surface of the TFT array substrate 8, the surface facing the liquid crystal layer 9. In such a configuration, regulating the thickness of the gap control layer 10D cancels out the influence on the aperture ratio due to the light blocking layers having different widths. Further, such a configuration provides various options for positioning the gap control layer 10D.

In the aforementioned preferred embodiment, the liquid crystal display includes colorant layers 3 provided to overlap the individual pixels in a plan view, in addition to the gap control layer. The colorant layers 3 each have a transmittance lower in the region adjacent to the light blocking layer 2 than a transmittance in the region adjacent to the light blocking layer 1. Such a configuration enables a wide range of regulation of the total transmittance of the transmittance of the liquid crystal layer and the transmittance of the colorant layer.

In the aforementioned preferred embodiment, the method for adjusting the liquid crystal display includes regulating color impurity and white brightness in the plurality of pixels in their entirety in accordance with an average of the transmittance within each colorant layer 3.

In such a configuration, setting the transmittance of the colorant layer in accordance with the average of the transmittance within each colorant layer would prevent the bad influence on the properties of the color purity and the properties of the white brightness if the single pixel is locally provided with the two regions: one including the region with a higher transmittance than the transmittance achieving the desired color purity or desired white brightness; and the other including the region with a lower transmittance than such a transmittance.

Different configurations illustrated in the specification, other than the above configurations may be omitted as necessary. That is, the above configurations alone bring the above-described effects.

However, the above configurations can additionally include at least one of the different configurations illustrated in the specification as necessary; that is, the above configurations can additionally include the different configurations illustrated in the present specification, which are excluded from these configurations. Such additionally included configurations still bring the above-described effects.

The order of the individual process steps can be changed unless otherwise specifically limited.

Modifications of Aforementioned Preferred Embodiments

The material quality, material, size, and shape of each component, the positions of components relative to each other, and conditions for implementation, described in each of the aforementioned preferred embodiments are illustrative in all aspects. Thus, they are not limited to what are described in the present invention.

Accordingly, numerous variations not shown can be assumed within the range of the technique disclosed in the specification. Examples of the variations include modification, addition and omission of at least one component. An additional example is extracting at least one component from at least one of the preferred embodiments and then combining the extracted component with another component of a different preferred embodiment.

Unless otherwise contradicted, "one" component described in each of the preferred embodiments may include "one or more" components.

Individual components are conceptual units. Thus, within the technique disclosed in the specification, one component may include multiple structures, one component may correspond to a part of some structure, and multiple components may be included in one structure.

Each component includes a structure of a different configuration or a different shape as long as the structure of the different configuration or the different shape achieves the same function.

The descriptions in the present specification are referred for all purposes regarding the present technique. It is thus not an admission that any of the descriptions provided herein are conventional techniques.

If the aforementioned preferred embodiments contain descriptions about materials without being particularly specified, it is to be understood that an example of these materials is an alloy containing other additives in these materials unless otherwise contradicted.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
 a plurality of pixels arranged in a liquid crystal display panel;
 a light blocking layer disposed between said plurality of pixels in a plan view; and
 a plurality of colorant layers provided to overlap each of said plurality of pixels in a plan view, wherein
 said light blocking layer comprises
  a first region, and
  a second region narrower than said first region in a plan view, and
 said plurality of colorant layers disposed on both sides of said light blocking layer in said second region have colors different from each other, and
 each of said plurality of colorant layers in a region which does not overlap with said light blocking layer in a plan view has a transmittance lower in a region adjacent to said second region than a transmittance in a region adjacent to said first region.

2. The liquid crystal display according to claim 1, wherein each of said colorant layers is thicker in said region adjacent to said second region than in said region adjacent to said first region.

3. The liquid crystal display according to claim 2, wherein each of said colorant layers has a thickness that increases gradually from said region adjacent to said first region toward said region adjacent to said second region.

4. The liquid crystal display according to claim 2, wherein each of said colorant layers has a thickness that increases stepwise from said region adjacent to said first region toward said position adjacent to said second region.

5. The liquid crystal display according to claim 1, wherein each of said colorant layers is provided with an opening in said region adjacent to said first region.

6. The liquid crystal display according to claim 5, further comprising a planarization layer disposed over each of said colorant layers, said planarization layer filling said opening of each of said colorant layers.

7. A liquid crystal display comprising:
 a plurality of pixels arranged in a liquid crystal display panel;
 a light blocking layer disposed between said plurality of pixels in a plan view;
 a gap control layer provided to overlap at least each of said plurality of pixels in a plan view; and
 a color filter substrate and an array substrate sandwiching a liquid crystal layer, wherein
 said light blocking layer comprises
  a first region, and
  a second region narrower than said first region in a plan view,
 said gap control layer covers at least part of said first region and part of said second region,
 said gap control layer in a region which does not overlap with said light blocking layer in a plan view is thicker in a region adjacent to said second region than in a region adjacent to said first region, and
 said liquid crystal layer is thinner in a region adjacent to said second region than in a region adjacent to said first region.

8. The liquid crystal display according to claim 7, wherein said gap control layer is disposed in only said region adjacent to said second region.

9. The liquid crystal display according to claim 7, wherein
 said light blocking layer is disposed on a surface of said color filter substrate, said surface facing said liquid crystal layer, and
 said gap control layer is disposed on said surface of said color filter substrate, said surface facing said liquid crystal layer.

10. The liquid crystal display according to claim 7, wherein
 said light blocking layer is disposed on a surface of said color filter substrate, said surface facing said liquid crystal layer, and
 said gap control layer is disposed on a surface of said array substrate, said surface facing said liquid crystal layer.

11. The liquid crystal display according to claim 7, further comprising a colorant layer provided to overlap each of said plurality of pixels in a plan view, wherein
 said colorant layer has a transmittance lower in said region adjacent to said second region than a transmittance in said region adjacent to said first region.

12. A method for adjusting a liquid crystal display, said liquid crystal display comprising:
 a plurality of pixels arranged in a liquid crystal display panel,
 a light blocking layer disposed between said plurality of pixels, and
 a plurality of colorant layers provided to overlap each of said plurality of pixels in a plan view,
 said light blocking layer comprising
  a first region, and
  a second region narrower than said first region in a plan view,
 said plurality of colorant layers disposed on both sides of said light blocking layer in said second region have colors different from each other,
 each of said plurality of colorant layers in a region which does not overlap with said light blocking layer in a plan view has a transmittance lower in a region adjacent to said second region than a transmittance in a region adjacent to said first region, and
 said method comprising regulating color purity and white brightness in said plurality of pixels in their entirety in accordance with an average of a transmittance within each of said plurality of colorant layers in a region which does not overlap with said light blocking layer in a plan view.

13. The method for adjusting a liquid crystal display according to claim 12, wherein each of said colorant layers is thicker in said region adjacent to said second region than in said region adjacent to said first region.

14. The liquid crystal display according to claim 7, further comprising
 a plurality of colorant layers provided to overlap each of said plurality of pixels in a plan view, wherein
 said plurality of colorant layers disposed on both sides of said light blocking layer in said second region have colors different from each other.

15. The liquid crystal display according to claim 1, further comprising a color filter substrate and an array substrate, said color filter substrate and said array substrate sandwiching a liquid crystal layer, wherein
said plurality of pixels are arranged in a matrix,
a plurality of video signal lines extending along a column direction in which said plurality of pixels are arranged are disposed in said array substrate,
said light blocking layer is formed on a surface of said color filter substrate, said surface facing said liquid crystal layer,
both said first region and said second region are provided to extend in said column direction,
said first region is provided in a position overlapping with a region where said plurality of video signal lines are disposed in a plan view, and
said light blocking layer in said second region is provided in a position overlapping with a region where said plurality of video signal lines are not disposed in a plan view.

16. The liquid crystal display according to claim 7, wherein
said plurality of pixels are arranged in a matrix,
a plurality of video signal lines extending along a column direction in which said plurality of pixels are arranged are disposed in said array substrate,
said light blocking layer is formed on a surface of said color filter substrate, said surface facing said liquid crystal layer,
both said first region and said second region are provided to extend in said column direction,
said first region is provided in a position overlapping with a region where said plurality of video signal lines are disposed in a plan view, and
said light blocking layer in said second region is provided in a position overlapping with a region where said plurality of video signal lines are not disposed in a plan view.

17. The liquid crystal display according to claim 12, further comprising a color filter substrate and an array substrate, said color filter substrate and said array substrate sandwiching a liquid crystal layer, wherein
said plurality of pixels are arranged in a matrix,
a plurality of video signal lines extending along a column direction in which said plurality of pixels are arranged are disposed in said array substrate,
said light blocking layer is formed on a surface of said color filter substrate, said surface facing said liquid crystal layer,
both said first region and said second region are provided to extend in said column direction,
said first region is provided in a position overlapping with a region where said plurality of video signal lines are disposed in a plan view, and
said light blocking layer in said second region is provided in a position overlapping with a region where said plurality of video signal lines are not disposed in a plan view.

* * * * *